US008362755B2

(12) United States Patent
Noda (10) Patent No.: US 8,362,755 B2
(45) Date of Patent: Jan. 29, 2013

(54) CURRENT-MODE CONTROL TYPE DC-DC CONVERTER AND CONTROL METHOD THEREFOR

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 349 days.

(21) Appl. No.: 12/551,688

(22) Filed: Sep. 1, 2009

(65) Prior Publication Data

US 2010/0060250 A1 Mar. 11, 2010

(30) Foreign Application Priority Data

Sep. 8, 2008 (JP) ................................. 2008-229945

(51) Int. Cl.
*G05F 1/565* (2006.01)
(52) U.S. Cl. ....................................... 323/285; 323/288
(58) Field of Classification Search .................. 323/222, 323/282, 284, 285, 288
See application file for complete search history.

(56) References Cited

U.S. PATENT DOCUMENTS

| | | | | |
|---|---|---|---|---|
| 6,034,513 | A * | 3/2000 | Farrington et al. | 323/222 |
| 7,321,222 | B2 * | 1/2008 | Hojo | 323/224 |
| 7,348,765 | B2 | 3/2008 | Nishida | |
| 7,723,967 | B2 * | 5/2010 | Bernardon | 323/266 |
| 7,777,469 | B2 * | 8/2010 | Nguyen | 323/282 |
| 7,795,851 | B2 * | 9/2010 | Ye et al. | 323/282 |
| 2005/0258814 | A1 * | 11/2005 | Chen et al. | 323/285 |
| 2007/0222502 | A1 | 9/2007 | Noda | |
| 2007/0285073 | A1 * | 12/2007 | Nishida | 323/288 |
| 2008/0150508 | A1 * | 6/2008 | Sohma | 323/283 |
| 2008/0218142 | A1 * | 9/2008 | Uehara | 323/282 |
| 2008/0231247 | A1 * | 9/2008 | Uehara | 323/284 |
| 2009/0066305 | A1 | 3/2009 | Noda | |
| 2009/0115374 | A1 | 5/2009 | Noda | |

FOREIGN PATENT DOCUMENTS

| | | |
|---|---|---|
| JP | 2007-209103 | 8/2007 |
| JP | 2008-199804 | 8/2008 |
| JP | 2009-71920 | 4/2009 |
| JP | 2009-130972 | 6/2009 |

OTHER PUBLICATIONS

U.S. Appl. No. 12/543,733 of Ippei Noda, filed Aug. 19, 2009.

* cited by examiner

*Primary Examiner* — Adolf Berhane
*Assistant Examiner* — Fred E Finch, III
(74) *Attorney, Agent, or Firm* — Cooper & Dunham LLP (57) ABSTRACT

A current-mode control type DC-DC converter includes a switching transistor turned on with a clock signal output in predetermined cycles, an inductor supplied with electric current when the switching transistor is turned on, an error amplifier circuit to output an error voltage that is an amplified difference between a predetermined reference voltage and a divided output voltage of the DC-DC converter, a slope voltage generation circuit to generate a slope voltage by performing slope compensation on an inductor current, a PWM comparator to compare the slope voltage with the error voltage and generate a reset pulse to turn off the switching transistor when the slope voltage reaches the error voltage, and a slope voltage maintenance mechanism to keep the slope voltage at the ground voltage from when the reset pulse is generated to when a subsequent clock signal is generated.

11 Claims, 4 Drawing Sheets

CURRENT-MODE CONTROL TYPE DC-DC CONVERTER AND CONTROL METHOD THEREFOR

CROSS-REFERENCE TO RELATED APPLICATIONS

This patent specification claims priority from Japanese Patent Application No. 2008-229945, filed on Sep. 8, 2008 in the Japan Patent Office, which is hereby incorporated by reference herein in its entirety.

BACKGROUND OF THE INVENTION

1. Technical Field

This disclosure relates to a current-mode control type DC-DC (direct current to direct current) converter used for power supplies in electronic devices, and a control method for a current-mode control type DC-DC converter.

2. Discussion of the Background

Currently, as power supply circuits used in portable electronic devices, non-insulated DC-DC converters that include inductors capable of downsizing and obtaining higher efficiency are widely used.

Classified by feedback method, there are two types of DC-DC converters, those employing a voltage-mode control method and those employing a current-mode control method.

The current-mode control type DC-DC converters have a number of advantages. For example, a line regulation expressed as a percentage of change in output voltage relative to the change in input voltage is higher, compensating signal phases as well as controlling the current are easier, and they are adapted to have a large capacity of electric power by arranging multiple current mode DC-DC converters in parallel. Therefore, at present, current-mode control type DC-DC converters are widely used.

Figure 3:
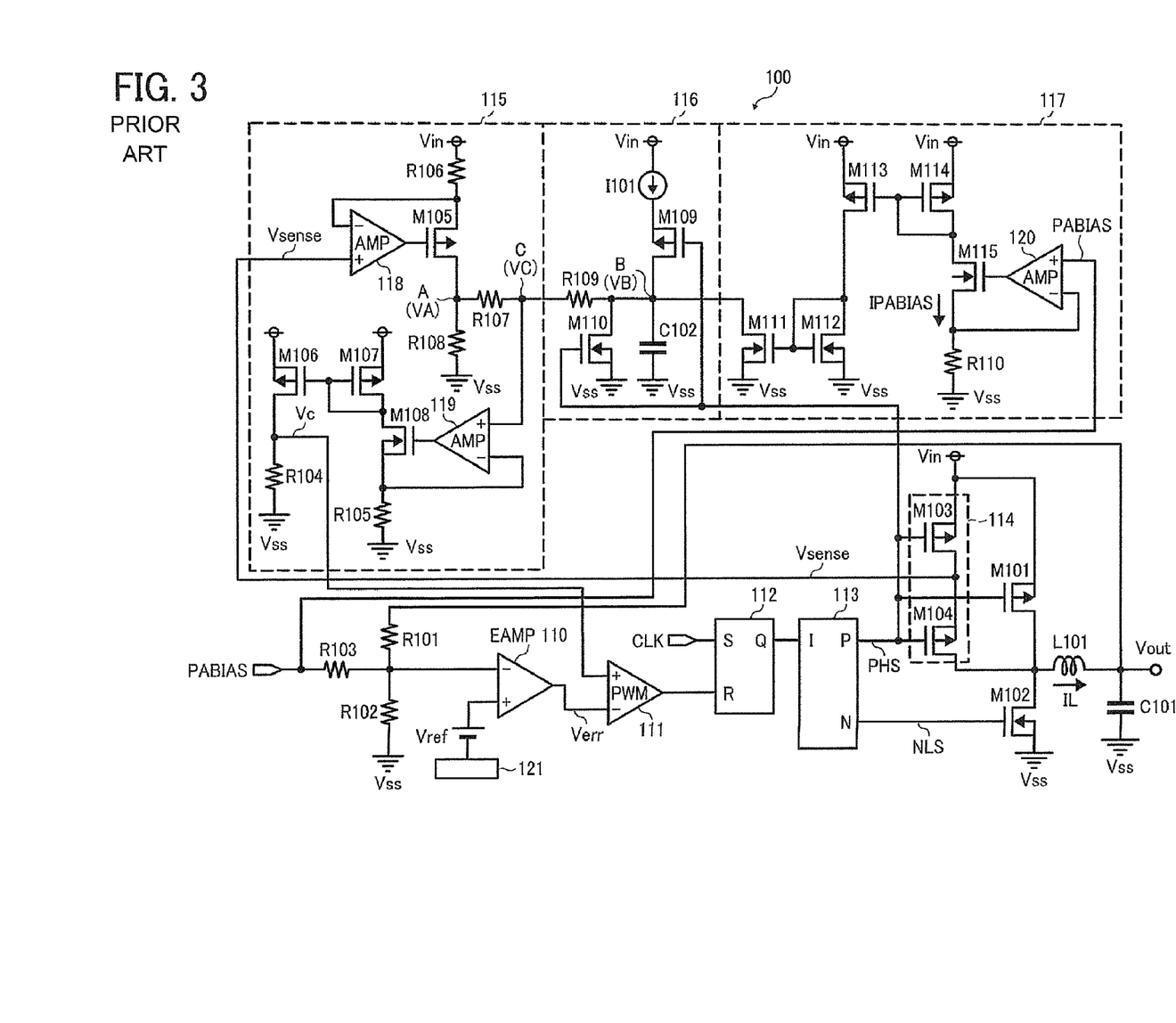
FIG. 3 illustrates related-art circuitry of a current-mode control type DC-DC converter 100.

FIG. 3 illustrates a configuration of a known DC-DC converter 100. The DC-DC converter 100 includes a slope voltage generation circuit 115, a fixed slope compensation voltage generation circuit 116, an amended slope compensation voltage generation circuit 117, a reference voltage generation unit 121, an error amplifier circuit 110, a PWM (pulse width modulation) control comparator 111, a RS (Reset-Set) flip-flop circuit 112, a driver circuit 113, a switching transistor M101, a synchronous rectification transistor M102, PMOS (P-channel metal oxide semiconductor) transistors M103 and M104, an inductor L101, a capacitor C101, and resistors R101 through R103. The DC-DC converter 100 further includes a power input terminal Vin, ground terminals Vss, an output terminal Vout, and an external-control bias PABIAS.

The slope voltage generation circuit 115 includes operational amplifier circuits 118 and 119, PMOS transistors M105, M106 and M107, NMOS (N-channel metal oxide semiconductor) transistor M108, and resistors R104 through R108. The PMOS transistors M106 and M107 form a current mirror circuit.

The fixed slope compensation voltage generation circuit 116 includes an electric current source L101, a PMOS transistor M109, a NMOS transistor M110, a capacitor C102, and a resistor R109.

The amended slope compensation voltage generation circuit 117 includes an operational amplifier circuit 120, PMOS transistors M113 and M114, NMOS transistors M111, M112, and M115, and a resistor R110. The PMOS transistors M113 and M114 form one current mirror circuit, and the NMOS transistors M111 and M112 form another current mirror circuit.

With reference to a timing chart shown in FIG. 4, operation of the known DC-DC converter 100 is described below.

A clock signal is inputted to a set terminal S of the RS flip-flop circuit 112, and the RS flip-flop circuit 112 is set up at every clock signal period. When the RS flip-flop circuit 112 is set up, an output signal of an output terminal Q thereof becomes high, and the signal is applied to an input terminal I of the driver circuit 113. Then, the driver circuit 113 turns both a control signal PHS outputted from an output terminal P and a control signal NLS outputted from an output terminal N low. Therefore, the switching transistor M101 is turned on, and the synchronous rectification transistor M102 is turned off. At this time, the PMOS transistors M103 and M104 forming a series circuit 114 connected in parallel to the switching transistor M101 are turned on.

Subsequently, when the switching transistor M101 is turned on, an electric current IL is supplied from a power input terminal Vin to the inductor L101. At this time, a voltage drop that is proportional to the inductor current IL is generated across a source and a drain of the switching transistor M101. The voltage drop is divided by the PMOS transistors M103 and M104, and the divided voltage is picked up as a voltage between a source and a drain of the PMOS transistor M103. This voltage is a voltage Vsense.

The voltage Vsense is supplied to a non-inverting input terminal of the operational amplifier circuit 118. An inverting output terminal of the operational amplifier circuit 118 is connected to a source of the PMOS transistor M105, and an output terminal thereof is connected to a gate of the PMOS transistor M105. The resistor R106 is connected between the source of the transistor M105 and the power input terminal Vin. The resistor R108 is connected between a drain of the transistor M105 and the ground terminal Vss.

Therefore, a drain voltage VA of the PMOS transistor M105 is proportional to the voltage Vsense and is a voltage changed to a ground standard voltage. Since the inductor current IL is increased over time, the voltage VA is increased over time as shown in FIG. 4.

It is to be noted that the voltage VA starts from a voltage in excess of 0 V (Volt) because the DC-DC converter operates in a continuous mode, in which the inductor current IL flows through the synchronous rectification transistor M102 while the switching transistor M101 is off, and the inductor current IL does not decrease to 0 A (Ampere) until the switching transistor M101 is turned on next time.

Next, ignoring operation of the amended slope compensation voltage generation circuit 117, operation of the fixed slope compensation voltage generation circuit 116 is described below.

When the control signal PHS is high, the NMOS transistor M110 is on, and a capacitor C102 discharges. At this time, the PMOS transistor M109 is off, and an electric current supply from the electric current source I101 to the capacitor C102 is stopped.

As described above, when the control signal PHS becomes low by inputting the clock signal to the RS flip-flop circuit 112, the NMOS transistor M110 is tuned off, and the PMOS transistor M109 is turned on. Then, the capacitor C102 is recharged by the electric current source I101, and a voltage VB at a junction node between a drain of the PMOS transistor M109 and the capacitor C102 is linearly increased as shown in FIG. 4.

Figure 4:
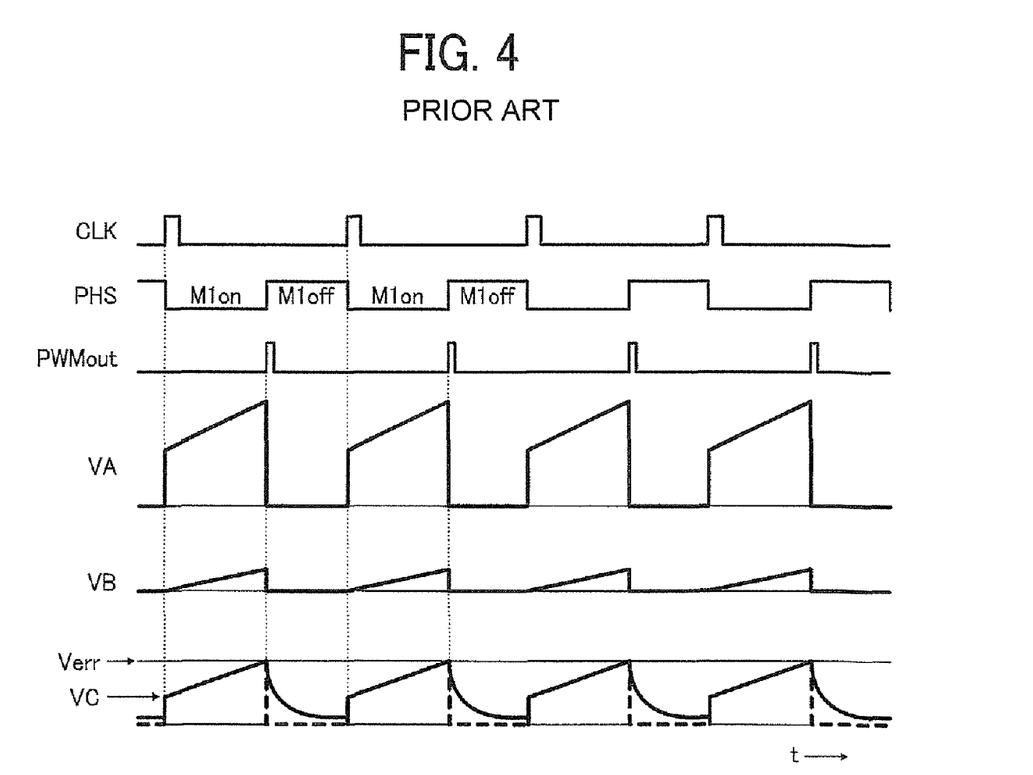
FIG. 4 is a timing chart of operation of the DC-DC converter 100 shown in FIG. 3.

The voltage VB is added to the voltage VA via the resistors R107 and R109, thus generating a voltage VC shown in FIG. 4. The voltage VC is applied to an operating amplifier circuit 119 and to a non-inverting input terminal of the PWM comparator 111 via the current mirror circuit constituted by the PMOS transistors M107 and M106.

By contrast, an output voltage Vout of the known DC-DC converter 100 is divided by the resistors R101 and R102 and inputted to an inverting input terminal of the error amplifier circuit 110. The reference voltage Vref is applied to a non-inverting input terminal of the error amplifier circuit 110.

The error amplifier circuit 110 outputs an error voltage Verr that is an amplified difference voltage between the divided output voltage Vout and the reference voltage Vref. The error voltage Verr is applied to an inverting input terminal of the PWM comparator 111.

As the voltage VC and the error voltage Verr in shown in FIG. 4 indicate, when the voltage VC is increased over time and reaches the error voltage Verr, an output signal of the PWM comparator 111 becomes high, and the RS flip-flop circuit 112 is reset.

Then, the output signal outputted from the output terminal Q becomes low, and the driver circuit 113 receives the signal thus outputted and switches the control signals PHS and NLS to high level.

Subsequently, the switching transistor M101 is turned off, and the synchronous rectification transistor M102 is turned on. At this time, because the NMOS transistor M110 is turned on, the capacitor C102 discharges, and the voltage VB is decreased to the ground voltage.

Further, because the PMOS transistor M109 is turned off, the electric current from the electric current source I101 is interrupted. Additionally, because the PMOS transistors M103 and M104 are turned off, the voltage Vsense becomes substantially equal to the input voltage Vin, and the voltage VA is decreased to the ground voltage.

Then, when the clock signal becomes high next time and the control signal PHS becomes low, the DC-DC converter 100 repeats the above-described operation.

However, in the above-described known slope voltage generation circuit, after the transistor M101 is turned off, the voltage VC is not immediately decreased to the ground voltage but is decreased slowly as indicated by solid curved lines shown in FIG. 4.

This situation occurs because it takes time to discharge the charge contained in a stray capacitance generated in an area from the junction node C to the non-inverting input terminal of the PWM comparator 111. If the above-described time lengthens and the voltage VC is not decreased to the ground voltage until a next clock signal is inputted, the residual voltage is added to the voltage VC in the next cycle and an accurate switching period cannot be obtained. As a result, the output voltage fluctuates, which is a problem.

In view of the foregoing, there is market demand for DC-DC converters capable of reducing fluctuations in the output voltage.

BRIEF SUMMARY

In an aspect of this disclosure provides a current-mode control type DC-DC converter to control an output voltage that includes a switching transistor e turned on every time a clock signal is input thereto in predetermined cycles, an inductor supplied with electric current when the switching transistor is turned on, an error amplifier circuit to output an error voltage that is generated by amplifying a difference between a predetermined reference voltage and a divided voltage by dividing the output voltage of the DC-DC converter, a slope voltage generation circuit to generate a slope voltage that is generated by performing slope compensation on an inductor current, a PWM comparator to compare the slope voltage with the error voltage and generate a reset pulse when the slope voltage reaches the error voltage and the reset pulse turns the switching transistor off, and a slope voltage maintenance mechanism to keep the slope voltage at ground voltage during a time period from when the reset pulse is generated to when a subsequent clock signal is generated.

In another aspect, there is provided a current-mode control type DC-DC converter to control an output voltage that includes switching means turned on every time a clock signal is input thereto in predetermined cycles, inductor means supplied with electric current when the switching means is turned on, error amplifier means for outputting an error voltage that is generated by amplifying a difference between a predetermined reference voltage and a divided voltage that is generated by dividing the output voltage of the DC-DC converter, slope voltage generation means for generating a slope voltage by performing slope compensation on an inductor current, PWM comparing means for comparing the slope voltage with the error voltage and generate a reset pulse to turn off the switching means when the slope voltage reaches the error voltage, and slope voltage maintenance means for keeping the slope voltage at the ground voltage during a time period from when the reset pulse is generated to when a subsequent clock signal is generated.

In another aspect, there is provided a method for controlling a current-mode control type DC-DC converter that includes turning on a switching transistor every time a clock signal is input thereto in predetermined cycles, supplying electric current to an inductor (L1) when the switching transistor is turned on, outputting an error voltage that is generated by amplifying a difference between a predetermined reference voltage and a divided voltage that is generated by dividing the output voltage of the DC-DC converter, generating a slope voltage by performing slope compensation on an inductor current, comparing the slope voltage with the error voltage, generating a reset pulse when the slope voltage reaches the error voltage, turning the switching transistor off in accordance with the reset pulse, and keeping the slope voltage at the ground voltage during a time period from when the reset pulse is generated to when a subsequent clock signal is generated.

BRIEF DESCRIPTION OF THE DRAWINGS

A more complete appreciation of the aforementioned and other aspects, features and advantages will be better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIGS. 1 and 2, a DC-DC converter according to an example embodiment of the present invention is described below.

Figure 1:
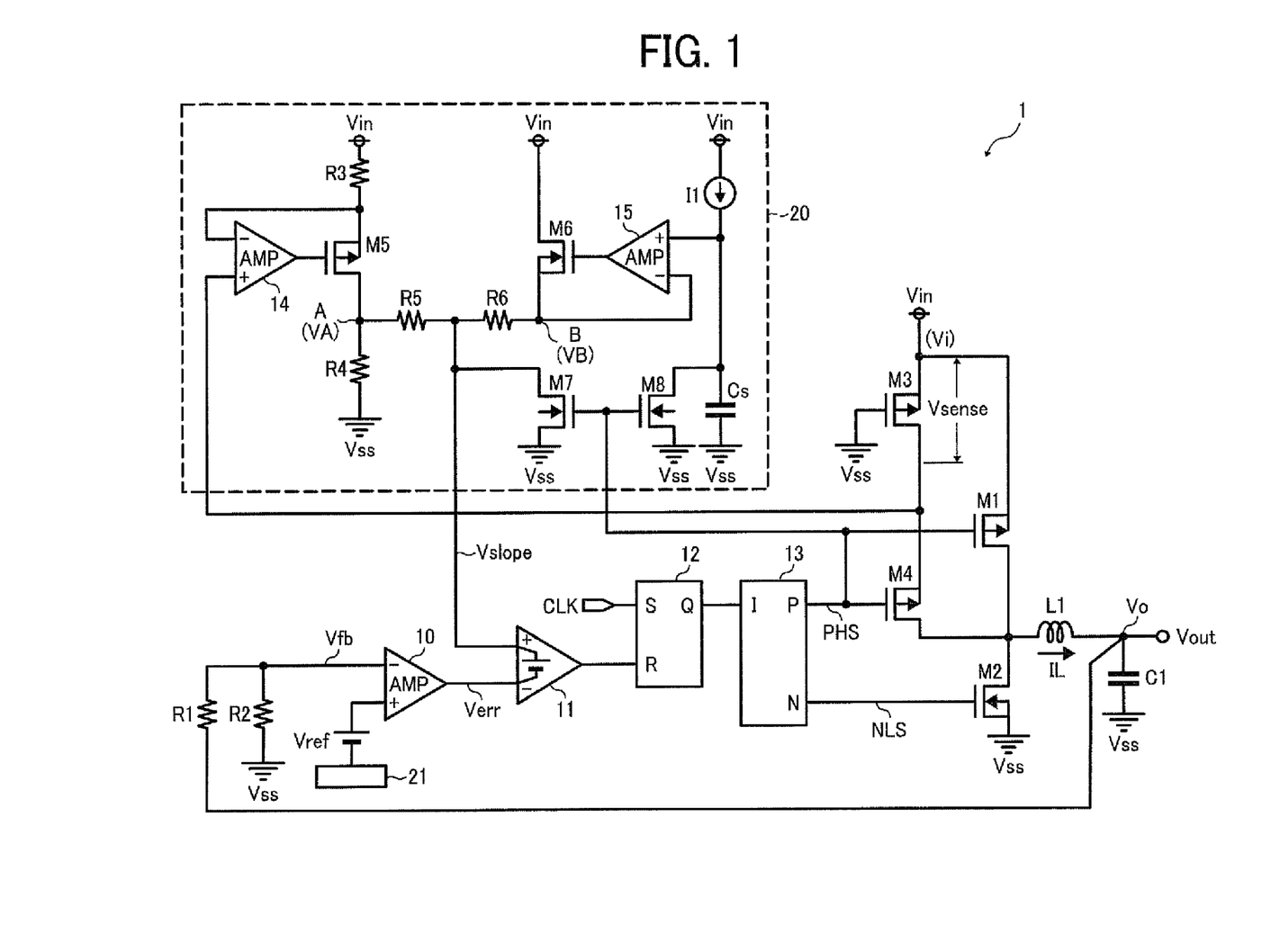
FIG. 1 illustrates circuitry of a current-mode control type DC-DC converter 1 according to an illustrative embodiment of the present invention.

FIG. 1 illustrates circuitry of a current-mode control type DC-DC converter 1 according to the present embodiment. The current-mode control type DC-DC converter 1 includes a slope voltage generation circuit 20, a reference voltage generation unit 21, an error amplifier circuit 10, a PWM (pulse width modulation) control comparator 11, a RS (Reset-Set) flip-flop circuit 12, and a driver circuit 13. The current-mode control type DC-DC converter 1 also includes a switching transistor M1, a synchronous rectification transistor M2, PMOS (P-channel metal oxide semiconductor) transistors M3 and M4, an inductor L1, a capacitor C1, and resistors R1 and R2.

The DC-DC converter 1 further includes a power input terminal Vin, ground terminals Vss, and an output terminal Vout. In the DC-DC converter 1, a reference voltage Vref generated by the reference voltage generation unit 21 is applied to a non-inverting input terminal of the PWM comparator 11, an input voltage Vi is applied to a predetermined portion between the power input terminal Vin and the ground terminal Vss, and an output voltage Vo is outputted from the output terminal Vout.

The slope voltage generation circuit 20 includes operational amplifier circuits 14 and 15, an electric current source I1, a PMOS transistor M5, and NMOS (N-channel metal oxide semiconductor) transistor M6, M7, and M8, a capacitor Cs, and resistors R3 through R6.

The output voltage Vo is divided by the resistors R1 and R2, and the divided voltage Vfb is applied to an inverting input terminal of the error amplifier circuit 10. The reference voltage Vref is applied to the non-inverting input terminal thereof. Then, the error amplifier circuit 10 outputs an error voltage Verr that is the amplified difference between the divided voltage Vfb and the reference voltage Vref from an output terminal thereof. The error voltage Verr is inputted to an inverting input terminal of the PWM comparator 11.

An output terminal of the PWM comparator 11 is connected to a reset terminal R of the RS flip-flop circuit 12. A set terminal S of the RS flip-flop circuit 12 receives a clock signal CLK that is outputted from an oscillator, not shown. An output terminal Q of the RS flip flop circuit 12 is connected to an input terminal I of the driver circuit 13. An output terminal P of the driver circuit 13 is connected to gates of the switching transistor M1, the PMOS transistor M4, and the NMOS transistors M7 and M8. An output terminal N of the driver circuit 13 is connected to a gate of the synchronous rectification transistor M2.

The switching transistor M1 consists of a PMOS transistor, its source connected to the power input terminal Vin and its drain connected to an end of the inductor L1 and a drain of the synchronous rectification transistor M2.

The synchronous rectification transistor M2 consists of a NMOS transistor whose source is connected to the ground terminal Vss. The other end of the inductor L1 is connected to the output terminal Vout. The capacitor C1 is connected between the output terminal Vout and the ground terminal Vss.

A source of the PMOS transistor M3 is connected to the power input terminal Vin, and its gate and drain are connected respectively to the ground terminal Vss and a source of the PMOS transistor M4. A drain of the PMOS transistor M4 is connected to the drain of the switching transistor M1.

A non-inverting input terminal of the operational amplifier circuit 14 is connected to the drain of the PMOS transistor M3, and an inverting input terminal thereof is connected to a source of the PMOS transistor M5. Its output terminal is connected to a gate of the PMOS transistor M5. The resistor R3 is connected between the source of the PMOS transistor M5 and the power input terminal Vin, and the resistor R4 is connected between a drain of the FMOS transistor M5 and the ground terminal Vss. The drain of the PMOS transistor M5 is also connected to an end of the resistor R5.

The electric current source I1 is connected between a non-inverting input terminal of the operational amplifier circuit 15 and the power input terminal Vin. The inverting input terminal of the operational amplifier circuit 15 is also connected to one terminal of the capacitor Cs and a drain of the NMOS transistor M8. The other terminal of the capacitor Cs and a source of the NMOS transistor M8 are respectively connected to the ground terminals Vss. An inverting input terminal of the operational amplified circuit 15 is connected to a source of the NMOS transistor M6 and one end of the resistor R6, and an output terminal of the operational amplified circuit 15 is connected to a gate of the NMOS transistor M6.

A drain of the NMOS transistor M6 is connected to the power input terminal Vi. The other end of the resistor R6 is connected to the other end of the resistor R5. A junction node between the resistor R5 and R6 is connected to the non-inverting input terminal of the PWM comparator 11. The NMOS transistor M7 is connected between the ground terminal Vss and a junction node between the resistors R5 and R6.

Next, operation of the circuitry shown in FIG. 1 is described below.

Figure 2:
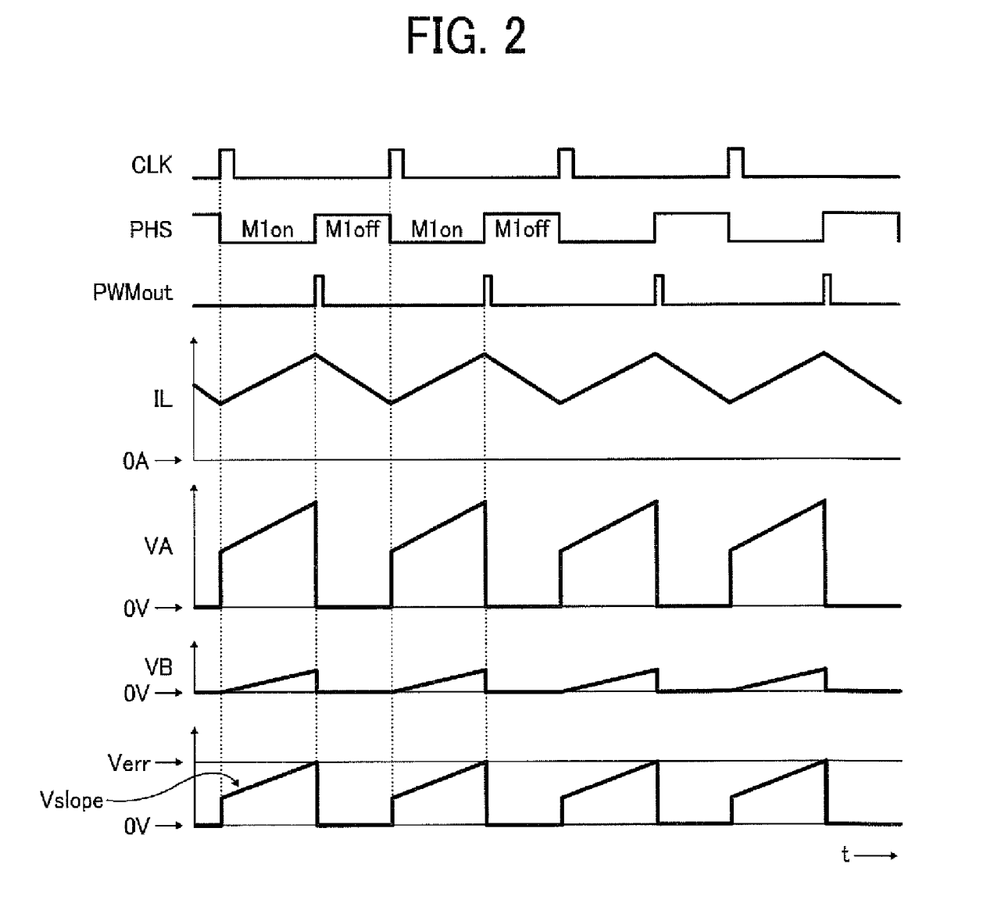
FIG. 2 is a timing chart of operation of the DC-DC converter 1 shown in FIG. 1.

FIG. 2 is a timing chart of operation of the DC-DC converter 1 shown in FIG. 1 and illustrates main signal operations in the present embodiment. In FIG. 2, reference characters CLK represent the clock signal inputted to the set terminal S of the RS flip-flop circuit 12 and PHS represent a control signal outputted from the output terminal P of the driver circuit 13. PWMout represents an output signal that is a reset pulse outputted from the PWM comparator 11, and IL is an electric current flowing through the inductor L1.

A voltage VA is a voltage at the drain of the PMOS transistor M5, and a voltage VB is a voltage at the source of the NMOS transistor M6. A voltage Vslope is a voltage at the junction node between the resistor R5 and resistor R6 and is applied to the non-inverting input terminal of the PWM comparator 11.

When the clock signal CLK becomes high, the RS flip-flop circuit 12 is set up, and a high level signal is outputted from its output terminal Q. The signal thus outputted is transmitted to the input terminal I of the driver circuit 13. Then, in the driver circuit 13, the control signal PHS outputted from the output terminal P and a control signal NLS outputted from the output terminal N become low.

When the control signal PHS becomes low, the switching transistor M1 is turned on, and the electric current IL is supplied to the inductor L1 from the power input terminal Vin (hereinafter "inductor current IL").

The inductor current IL right after the switching transistor M1 is turned on is identical to the inductor current IL just before the switching transistor M1 is turned on. Therefore, in continuous mode, the inductor current IL is a positive value, as shown in FIG. 2.

In current-mode control, in order to provide a feedback loop corresponding to the inductor current IL in the DC-DC converter 1, the inductor current IL is converted into a voltage, and the voltage is inputted into the PWM comparator 11. Then, the PWM comparator 11 compares the voltage thus inputted with the output voltage Vo. Therefore, the voltage is proportional to the inductor current IL. The slope voltage generation circuit 20 is included for generating the voltage.

The inductor current IL increases over time. An on-resistance value of the switching transistor M1 is kept almost constant, and therefore, a voltage between the source and the drain of the switching transistor M1 is proportional to the inductor current IL.

Because the gate of the PMOS transistor M3 is connected to the ground terminal Vss, the PMOS transistor M3 is always on. The PMOS transistor M4 is controlled to switch on/off in synchronization with the switching transistor M1.

Further, the PMOS transistor M3 is serially connected to the PMOS transistor M4, and the PMOS transistors M3 and M4 are connected in parallel to the switching transistor M1. Therefore, a voltage Vsense between the source and the drain of the PMOS transistor M3 is identical to a voltage that is generated by dividing the voltage on both sides of the switching transistor M1 by the on-resistances of the PMOS transistors MS and M4. In other words, the voltage Vsense is proportional to the inductor current IL.

The voltage Vsense is applied to the non-inverting input terminal of the operational amplifier circuit 14. The operational amplifier circuit 14 controls the voltage at the gate of the transistor M5 so that the voltage at the source of the transistor M5 is identical or similar to the voltage Vsense.

As a result, when reference character Id5 represents the current at the drain of the PMOS transistor M5, the drain current Id5 is proportional to the voltage Vsense and is expressed by a formula Id5=Vsense/R3.

When the resistance of the resistor R4 is considerably smaller than that of the resistor R5, expressed as R4<<R5, almost the entire drain current Id5 flows to the resistor R4, and the voltage VA at the drain of the PMOS transistor M5 is expressed as VA=R4×(Vsense/R3). When the resistance of the resistor R4 is equal to that of the resistor R3, expressed as R4=R3, the voltage VA is identical to the Vsense, expressed as VA=Vsense. Additionally, the voltage VA works as a standard of the ground voltage.

Next, a slope compensation circuit is described. In the current-mode control, when a proportion of a period during which the switching transistor M1 is on in entire operation period exceeds 50%, a sub-harmonic oscillation that makes the operation unstable is generated. Therefore, slope compensation to add another slope voltage to the slope voltage Vslope that is proportional to the inductor current IL is required.

When the control signal PHS is low, the NMOS transistor M8 is turned off. Then, the capacitor Cs is charged with a constant current by the electric current source I1, and the voltage at the terminal of the capacitor Cs is linearly increased. The operational amplifier circuit 15 controls the voltage at the gate of the NMOS transistor M6 so that a voltage VB at the source of the NMOS transistor M6 is identical to the voltage at the terminal of the capacitor Cs. Therefore, the voltage VB is increased from the ground voltage over time, as shown in FIG. 2.

The voltage Vslope is a voltage value between the voltage VA and the voltage VB, and is expressed by formula 1 shown below.

$$V\text{slope}=VB+(R6\times(VA-VB))/(R5+R6) \quad (1)$$

When the resistor R5 and the resistor R6 have the same value, the relation can be expressed by formula 2 shown below.

$$V\text{slope}=VB+(VA-VB)/2=(VA+VB)/2 \quad (2)$$

In other words, the voltage Vslope is half the sum of the voltage VB and the voltage VA. The voltage Vslope is applied to the non-inverting input terminal of the PWM comparator 11.

By contrast, the output voltage Vo of the DC-DC converter 1 is divided by the resistors R1 and R2, and the divided voltage Vfb is applied to the inverting input terminal of the error amplifier circuit 10. Additionally, the reference voltage Vref is applied to the non-inverting input terminal of the error amplifier circuit 10, and the error amplifier circuit 10 outputs the error voltage Verr that is the amplified difference between the reference voltage Vref and the divided voltage Vfb. The voltage Verr is applied to the inverting input terminal of the PWM comparator 11.

When the slope voltage Vslope is increased and reaches the error voltage Verr, the PWM comparator 11 outputs the high level signal. The signal thus outputted is transmitted to the reset terminal R of the RS flip-flop circuit 12. Therefore, the RS flip-flop circuit 12 is reset, and the output signal from the output terminal Q becomes low. Then, both the output signals from the output terminals P and N of the driver circuit 13 become high, that is, the control signals PHS and NLS become high.

If for some reason the output voltage Vo exceeds a predetermined voltage, the error voltage Verr that is outputted from the error amplifier circuit 10 is decreased to the ground voltage. Under this condition, when the clock signal CLK becomes high and the switching transistor M1 is turned on, causing the slope voltage Vslope to be outputted, the slope voltage Vslope starts from the ground voltage, and therefore, the output signal of the comparator 11 becomes unstable. Thus, the reset signal might be outputted to the RS flip-flop circuit 12 accidentally.

In order to solve this problem, an offset voltage is applied to an input portion of the PWM comparator 11. In this configuration, when the error voltage Verr and the slope voltage Vslope are ground voltage, the output signal of the PWM comparator 11 becomes high. At this time, even when the clock signal CLK is inputted to the RS flip-flop circuit 12, the configuration can prevent the S flip-flop circuit 12 from outputting the high level signal from the output terminal Q thereof.

Herein, when the error voltage Verr exceeds the offset voltage, the output signal of the PWM comparator 11 becomes low, and thus the RS flip-flop circuit 12 can be set up by the clock signal CLK. As a result, even when the output signal of the error amplifier circuit 10 declines to the ground voltage, the DC-DC converter can maintain stable operation.

When the control signals PHS and NLS become high, the switching transistor M1 is turned off and the synchronous rectification transistor M2 is turned on. Then, the inductor current IL that is a current flowing through the inductor L1 is supplied from the ground terminal Vss via the synchronous rectification transistor M2 and is decreased over time.

Further, when the control signal PHS becomes high, the PMOS transistor M4 is turned off. Then, the electric current does not flow at the drain of the PMOS transistor M3, and the voltage Vsense corresponding to the amount of the voltage drop of the PMOS transistor M3 is 0 V. As a result, the electrical potential at the source of the PMOS transistor M5 is identical to the input voltage Vi, and the drain current Id5 of the PMOS transistor M5 is 0 A. Then, the voltage VA is decreased to the ground voltage.

When the control signal PHS becomes high, the NMOS transistors M7 and M8 are turned on. When the NMOS transistor M7 is turned on, the non-inverting input terminal of the PWM comparator 11 is short-circuited to the ground terminal Vss. Therefore, the voltage Vslope is rapidly decreased to the ground voltage. As a result, voltage Vslope falling edge lag can be prevented.

When the NMOS transistor M8 is turned on, the capacitor Cs is discharged, and accordingly the voltage VB is rapidly decreased to the ground voltage. It is to be noted that, in the present embodiment, the electric current from the electric current source I1 flows to the NMOS transistor M8 while the NMOS transistor M8 is on. However, by including a transistor corresponding to the PMOS transistor M9 shown in FIG. 3, the electric current from the electric current source I1 can be shut down while the NMOS transistor M8 is on.

The above-described operation is repeated when the clock signal CLK becomes high next time.

As described above, in the present embodiment, after the reset pulse is outputted, the slope voltage Vslope is forcibly decreased to the ground voltage, and fluctuation of the output voltage Vo can be prevented.

More particularly, when the switching transistor M1 is turned off, the NMOS transistor M7 is turned on so that the slope voltage Vslope is forcibly decreased to the ground voltage. Therefore, when the transistor M1 is turned on next time, the output voltage Vo does not fluctuate because no previously generated slope voltage remains.

Moreover, the PWM comparator 11 has the input offset voltage, and the DC-DC converter can executes stable operation, even when an overshoot is caused by rapid fluctuations in the load and the output voltage exceeds the predetermined voltage.

Numerous additional modifications and variations are possible in light of the above teachings. It is therefore to be understood that, within the scope of the appended claims, the disclosure of this patent specification may be practiced otherwise than as specifically described herein.

What is claimed is:

1. A current-mode control type DC-DC converter to control an output voltage comprising:
   a switching transistor turned on every time a clock signal is input thereto in predetermined cycles;
   an inductor supplied with electric current when the switching transistor is turned on;
   an error amplifier circuit to output an error voltage that is generated by amplifying a difference between a predetermined reference voltage and a divided voltage that is generated by dividing the output voltage of the DC-DC converter;
   a slope voltage generation circuit configured to generate a slope voltage by performing slope compensation on an inductor current;
   a PWM comparator to compare the slope voltage with the error voltage and generate a reset pulse to turn off the switching transistor when the slope voltage reaches the error voltage; and
   a slope voltage maintenance circuit configured to keep the slope voltage at the ground voltage during a time period from when the reset pulse is generated to when a subsequent clock signal is generated, the slope voltage maintenance circuit comprising:
   a first transistor including a first input terminal and a second input terminal, wherein the first input terminal of the first transistor receives the slope voltage, a second input terminal of the first transistor is coupled to the ground voltage, and a gate of the first transistor is directly connected to a gate of the switching transistor;
   a second transistor having a gate connected to the gate of the first transistor and having a source connected to the ground voltage;
   a capacitor having one end connected to a drain of the second transistor and having the other end connected to the ground voltage;
   a current source having one end connected to an input terminal and having the other end connected to the one end of the capacitor;
   a first operational amplifier circuit having a non-inverting terminal connected to the current source and the capacitor;
   a third transistor having a gate connected to an output terminal of the first operational amplifier circuit and a source connected to an inverting input terminal of the first operational amplifier circuit at a first junction node; and
   a first resistor having one end connected to the first junction node,
   wherein the slope voltage generation circuit includes:
   a second operational amplifier circuit having a non-inverting input terminal receiving the detection voltage that is proportional to the inductor current of the inductor;
   a second resistor having one end connected to an inverting input terminal of the second operational amplifier circuit and having the other end connected to the input terminal;
   a fourth transistor having a gate connected to an output terminal of the second operational amplifier circuit and having a source connected to the inverting input terminal of the second operational amplifier circuit;
   a third resistor having one end connected to a drain of the fourth transistor at a second junction node and having the other end connected to the ground voltage; and
   a fourth resistor having one end connected to the second junction node between the fourth transistor and the third resistor and having the other end—directly—connected to the first resistor of the slope voltage maintenance circuit, and
   wherein the reset pulse generated by the PWM comparator turns off the switching transistor and turns on the first transistor, such that the slope voltage received through the first input terminal of the first transistor is decreased to the ground voltage coupled to the second input terminal of the first transistor.

2. The current-mode control type DC-DC converter according to claim 1, wherein the PWM comparator includes an offset voltage and generates the reset pulse when a voltage generated by adding the input offset voltage to the slope voltage exceeds the error voltage.

3. The current-mode control type DC-DC converter of claim 1, wherein the inductor is connected between a drain of the switching transistor and an output terminal corresponding to the output voltage.

4. The current-mode control type DC-DC converter of claim 3, further comprising:
   a first voltage-dividing transistor having a gate being connected to the ground voltage;
   a second voltage-dividing transistor being connected to the first voltage-dividing transistor in series, the second voltage-dividing transistor being turned on and off synchronized with the switching transistor;
   wherein the first voltage-dividing transistor and the second voltage-dividing transistor are connected to the switching transistor in parallel,
   wherein on-resistances of the first voltage-dividing transistor and the second voltage-dividing transistor divide a source-drain voltage of the switching transistor, and wherein a source-drain voltage of the first voltage-dividing transistor that is proportional to the inductor current of the inductor is applied to the slope voltage generation circuit as a detection voltage.

5. The current-mode control type DC-DC converter of claim 1, wherein the second transistor in the slope voltage maintenance circuit turns on and discharges the capacitor when the PWM comparator generates the reset pulse.

6. The current-mode control type DC-DC converter of claim 1, wherein the gates of the first transistor and the second transistor are connected to the gate of the switching transistor, and the first transistor and the second transistor are turned on when the switching transistor is turned off to cause the slope voltage to rapidly decrease to the ground voltage.

7. The current-mode control type DC-DC converter of claim 1, wherein the slope voltage corresponds to a voltage at a junction node between the first resistor and the fourth resistor, and the first terminal of the first transistor.

8. The current-mode control type DC-DC converter of claim 1, wherein the slope voltage corresponds to half of a voltage at the first junction node and the second junction node,
the voltage at the first junction node corresponding to a source voltage of the third transistor in the slope voltage maintenance circuit, and the voltage at the second junction node corresponding to a drain voltage of the fourth transistor that is proportional to the inductor current of the inductor.

9. The current-mode control type DC-DC converter of claim 1, wherein the second operational amplifier circuit controls a voltage at the gate of the fourth transistor such that the drain voltage of the fourth transistor corresponds to the detection voltage.

10. A method for controlling a current-mode control type DC-DC converter including a slope voltage maintenance circuit, a switching transistor, an inductor supplied with electric current when the switching transistor is turned on, and a slope voltage generation circuit that generates a slope voltage, wherein the slope voltage maintenance circuit comprises:
a first transistor including a first input terminal and a second input terminal, wherein the first input terminal of the first transistor receives the slope voltage, a second input terminal of the first transistor is coupled to the ground voltage, and a gate of the first transistor is directly connected to a gate of the switching transistor;
a second transistor having a gate connected to the gate of the first transistor and having a source connected to the ground voltage;
a capacitor having one end connected to a drain of the second transistor and having the other end connected to the ground voltage:
a current source having one end connected to an input terminal and having the other end connected to the one end of the capacitor;
a first operational amplifier circuit having a non-inverting terminal connected to the current source and the capacitor;
a third transistor having a gate connected to an output terminal of the first operational amplifier circuit and a source connected to an inverting input terminal of the first operational amplifier circuit at a first function node; and
a first resistor having one end connected to the first junction node, and
wherein the slope voltage generation circuit includes:
a second operational amplifier circuit having a non-inverting input terminal receiving a detection voltage that is proportional to an inductor current of the inductor;
a second resistor having one end connected to an inverting input terminal of the second operational amplifier circuit and having the other end connected to the input terminal;
a fourth transistor having a gate connected to an output terminal of the second operational amplifier circuit and having a source connected to the inverting input terminal of the second operational amplifier circuit:
a third resistor having one end connected to a drain of the fourth transistor at a second junction node and having the other end connected to the ground voltage: and
a fourth resistor having one end connected to the second junction node between the fourth transistor and the third resistor and having the other end—directly—connected to the first resistor of the slope voltage maintenance circuit,
said method comprising:
turning on a switching transistor with a clock signal that is input thereto in predetermined cycles;
supplying electric current to an inductor when the switching transistor is turned on;
generating an error voltage by amplifying a difference between a predetermined reference voltage and a divided voltage that is generated by dividing the output voltage of the DC-DC converter;
generating, by the slope voltage generation circuit, a slope voltage by performing slope compensation on an inductor current;
comparing the slope voltage with the error voltage;
generating a reset pulse to turn off the switching transistor when the slope voltage reaches the error voltage; and
keeping, by the slope voltage maintenance circuit, the slope voltage at the ground voltage during a time period from when the reset pulse is generated to when a subsequent clock signal is generated,
wherein a first input terminal of the first transistor of the slope voltage maintenance mechanism receives the slope voltage, a second input terminal of the first transistor is coupled to the ground voltage, and a gate of the first transistor is directly connected to a gate of the switching transistor, and
wherein the reset pulse turns off the switching transistor and turns on the first transistor, such that the slope voltage received through the first input terminal of the first transistor is decreased to the ground voltage coupled to the second input terminal of the first transistor.

11. The method for controlling the current-mode control type DC-DC converter according to claim 10, further comprising:
setting an offset voltage;
adding the input offset voltage to the slope voltage; and
generating the reset pulse when a voltage generated by adding the input offset voltage to the slope voltage exceeds the error voltage.

* * * * *